(12) United States Patent
Welch et al.

(10) Patent No.: US 6,446,378 B1
(45) Date of Patent: Sep. 10, 2002

(54) FISHING NET DEVICE

(76) Inventors: Ronald K. Welch, 280 Ord St., Salisbury, PA (US) 15558; Lisa L. Welch, 280 Ord St., Salisbury, PA (US) 15558

( * ) Notice: Subject to any disclaimer, the term of this patent is extended or adjusted under 35 U.S.C. 154(b) by 3 days.

(21) Appl. No.: 09/648,232

(22) Filed: Aug. 25, 2000

(51) Int. Cl.[7] ............................................. A01K 77/00
(52) U.S. Cl. ............................................. 43/11; 43/12
(58) Field of Search ..................... 43/11, 12, 100, 43/110, 7

(56) References Cited

U.S. PATENT DOCUMENTS

| 1,169,311 | A | * | 1/1916 | Walter |  |
|---|---|---|---|---|---|
| 2,003,893 | A | * | 6/1935 | La Pan |  |
| 2,115,082 | A | * | 4/1938 | Phillips |  |
| 2,485,781 | A |   | 10/1949 | Schreiber et al. |  |
| 2,683,949 | A | * | 7/1954 | Berezansky |  |
| 2,738,608 | A | * | 3/1956 | Buzzini |  |
| 3,579,890 | A |   | 5/1971 | Maxwell |  |
| 4,031,650 | A | * | 6/1977 | Popeil | 43/12 |
| 4,050,177 | A |   | 9/1977 | Gerritsen |  |
| D273,409 | S |   | 4/1984 | Willinger |  |
| 4,446,646 | A | * | 5/1984 | van't Veld | 43/12 |
| 4,706,404 | A | * | 11/1987 | Kun | 43/12 |
| 5,581,929 | A | * | 12/1996 | Molloy | 43/12 |
| 6,058,642 | A | * | 5/2000 | Branneman | 43/12 |
| 6,260,302 | B1 | * | 7/2001 | Blaschke | 43/12 |

* cited by examiner

Primary Examiner—Charles T. Jordan
Assistant Examiner—Kimberly S. Smith

(57) ABSTRACT

A fishing net device for providing an easier way for the user to carry and transport the fishing net. The fishing net device includes a housing having a side wall and an open front end; and also includes net support members being removably disposed inside the housing and through the open front end; and further includes a net member being attached to the net support members and being removably disposed within the housing; and also includes A release assembly for releasing and urging the net support members from inside the housing.

12 Claims, 3 Drawing Sheets

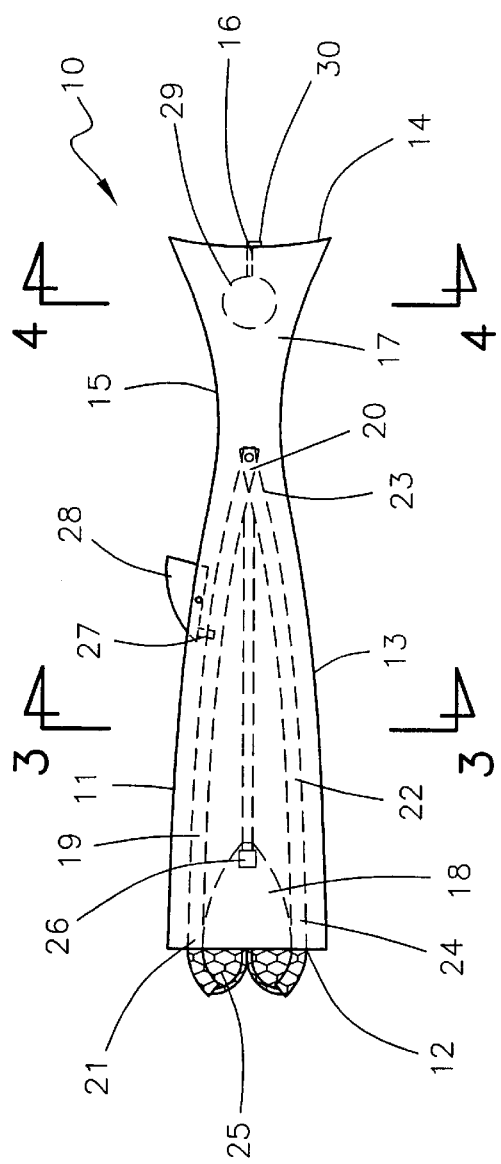
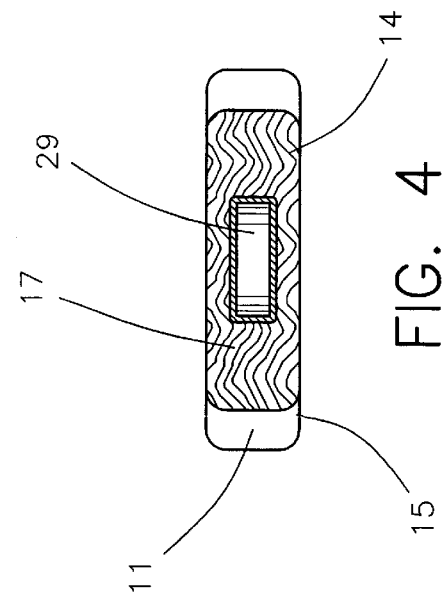
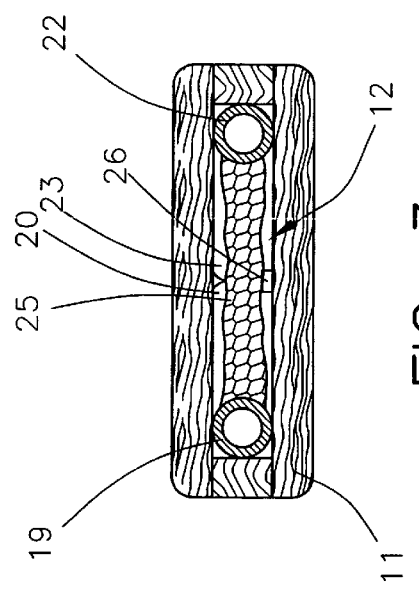

FISHING NET DEVICE

BACKGROUND OF THE INVENTION

1. Field of the Invention

The present invention relates to a spring-loaded net device and more particularly pertains to a new fishing net device for providing an easier way for the user to carry and transport the fishing net.

2. Description of the Prior Art

The use of a spring-loaded net device is known in the prior art. More specifically, a spring-loaded net device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,446,646; U.S. Pat. No. 4,050,177; U.S. Pat. No. 5,581,929; U.S. Pat. No. 3,579,890; U.S. Pat. No. 2,485,781; and U.S. Pat. No. Des. 273,409.

While these devices fulfill their respective, particular objectives and requirements, the aforementioned patents do not disclose a new fishing net device. The inventive device includes a housing having a side wall and an open front end; and also includes net support members being removably disposed inside the housing and through the open front end; and further includes a net member being attached to the net support members and being removably disposed within the housing; and also includes A release assembly for releasing and urging the net support members from inside the housing.

In these respects, the fishing net device according to the present invention substantially departs from the conventional concepts and designs of the prior art, and in so doing provides an apparatus primarily developed for the purpose of providing an easier way for the user to carry and transport the fishing net.

SUMMARY OF THE INVENTION

In view of the foregoing disadvantages inherent in the known types of spring-loaded net device now present in the prior art, the present invention provides a new fishing net device construction wherein the same can be utilized for providing an easier way for the user to carry and transport the fishing net.

The general purpose of the present invention, which will be described subsequently in greater detail, is to provide a new fishing net device which has many of the advantages of the spring-loaded net device mentioned heretofore and many novel features that result in a new fishing net device which is not anticipated, rendered obvious, suggested, or even implied by any of the prior art springloaded net device, either alone or in any combination thereof.

To attain this, the present invention generally comprises a housing having a side wall and an open front end; and also includes net support members being removably disposed inside the housing and through the open front end; and further includes a net member being attached to the net support members and being removably disposed within the housing; and also includes A release assembly for releasing and urging the net support members from inside the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing net device which has many of the advantages of the spring-loaded net device mentioned heretofore and many novel features that result in a new fishing net device which is not anticipated, rendered obvious, suggested, or even implied by any of the prior art spring-loaded net device, either alone or in any combination thereof.

It is another object of the present invention to provide a new fishing net device which may be easily and efficiently manufactured and marketed.

It is a further object of the present invention to provide a new fishing net device which is of a durable and reliable construction.

An even further object of the present invention is to provide a new fishing net device which is susceptible of a low cost of manufacture with regard to both materials and labor, and which accordingly is then susceptible of low prices of sale to the consuming public, thereby making such fishing net device economically available to the buying public.

Still yet another object of the present invention is to provide a new fishing net device which provides in the apparatuses and methods of the prior art some of the advantages thereof, while simultaneously overcoming some of the disadvantages normally associated therewith.

Still another object of the present invention is to provide a new fishing net device for providing an easier way for the user to carry and transport the fishing net.

Yet another object of the present invention is to provide a new fishing net device which includes a housing having a side wall and an open front end; and also includes net support members being removably disposed inside the housing and through the open front end; and further includes a net member being attached to the net support members and being removably disposed within the housing; and also includes A release assembly for releasing and urging the net support members from inside the housing.

Still yet another object of the present invention is to provide a new fishing net device that prevents the net member from getting tangled and caught on objects while the user is carrying the fishing net device.

Even still another object of the present invention is to provide a new fishing net device that is easy and convenient for the user to quickly deploy the fishing net only when needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the present invention with the net member being in a storage position.

FIG. 3 is a cross-sectional view of the housing of the present invention.

FIG. 4 is a back end cross-sectional view of the housing of the present invention.

DESCRIPTION OF THE PREFERRED EMBODIMENT

Figure 1:
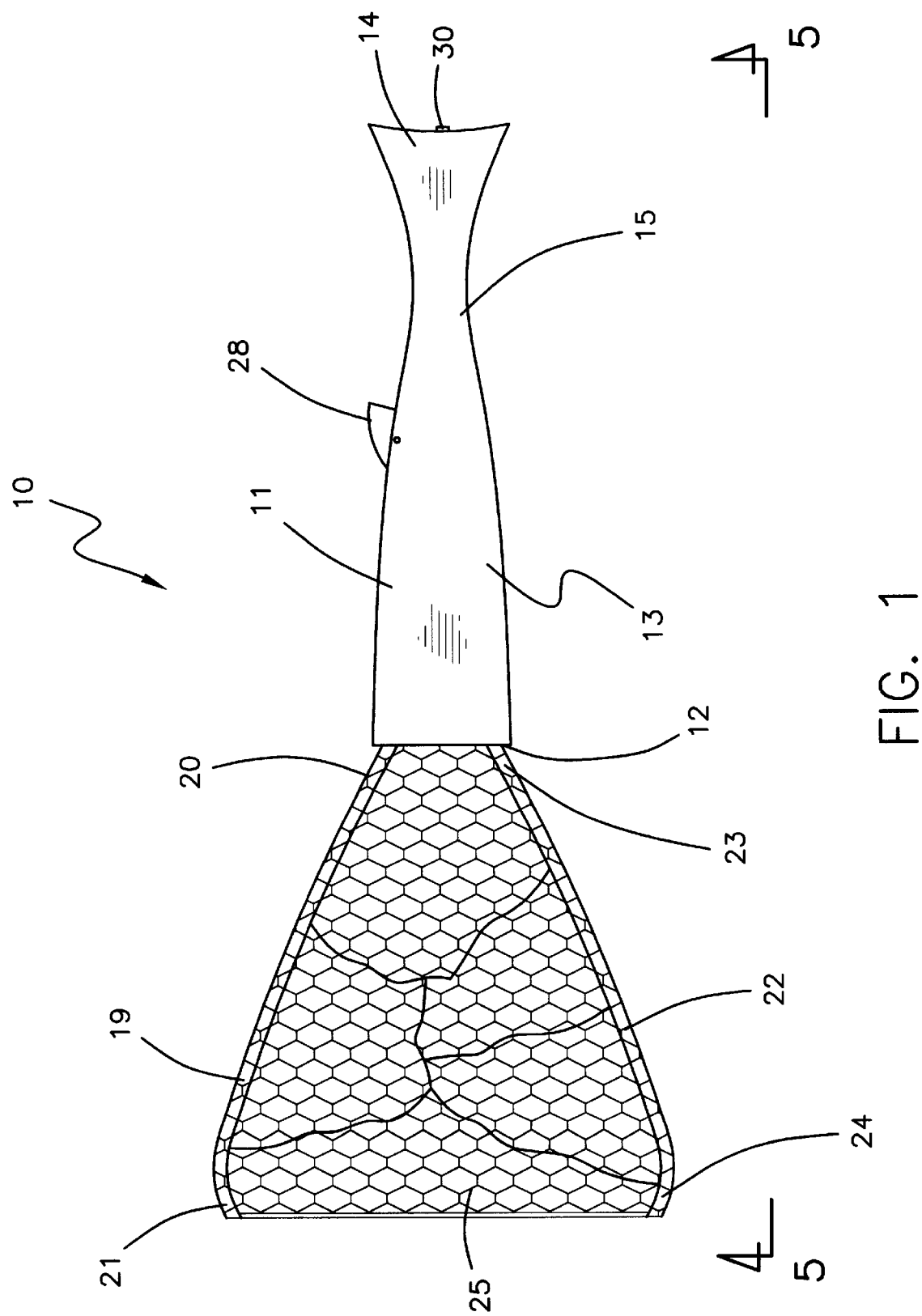
FIG. 1 is a side elevational view of a new fishing net device according to the present invention shown with the net member being deployed.
Figure 5:
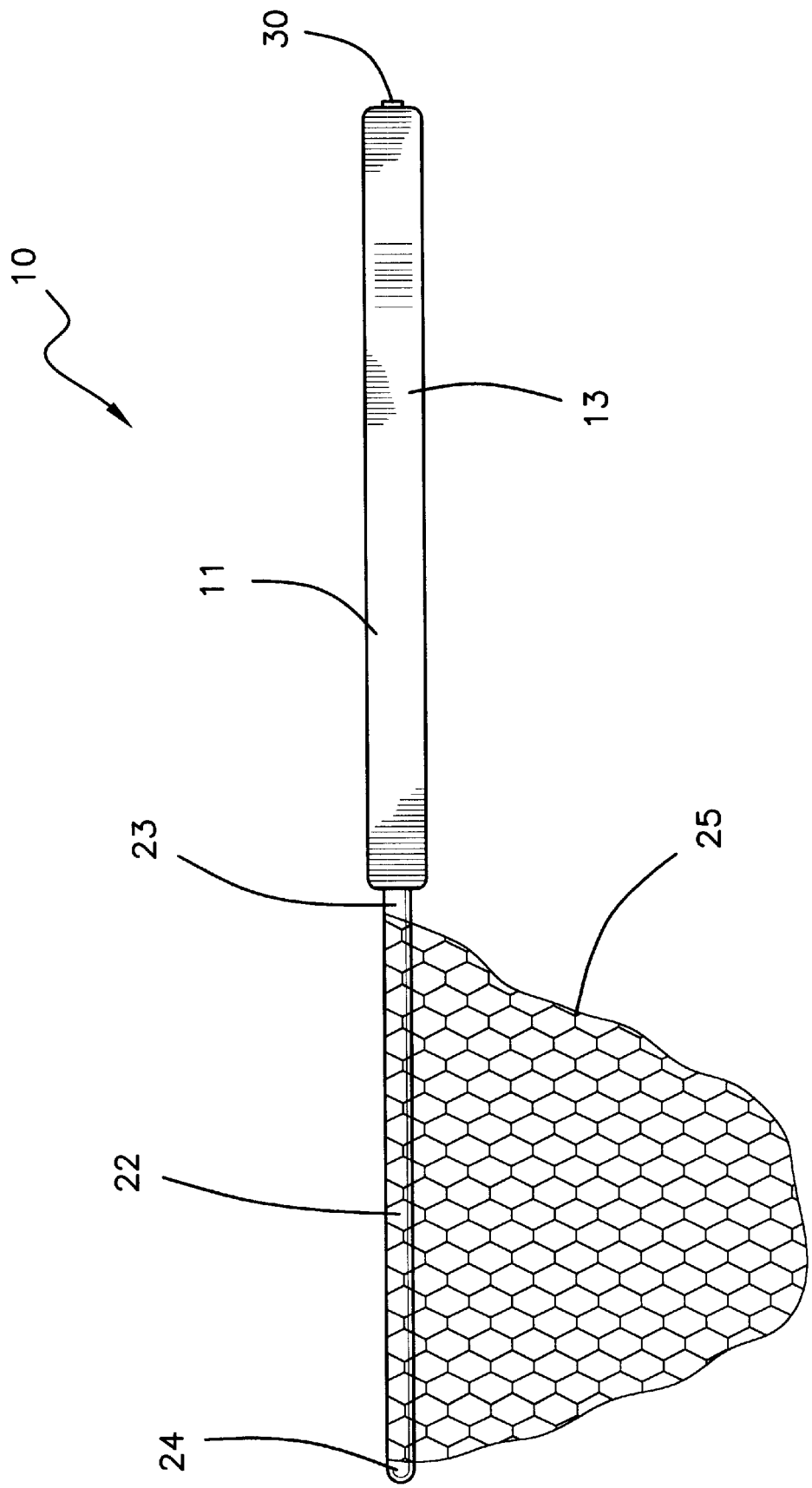
FIG. 5 is an edge elevational view of the present invention with the net member being deployed.

With reference now to the drawings, and in particular to FIGS. 1 through 5 thereof, a new fishing net device embodying the principles and concepts of the present invention and generally designated by the reference numeral 10 will be described. As best illustrated in FIGS. 1 through 5, the fishing net device 10 generally comprises a housing 11 having a side wall 13 and an open front end 12. The housing 11 is tapered inwardly from the open front end 12 toward a back end 14 thereof for a user to easily and conveniently hold the housing 11 near the back end thereof 14. The housing 11 further includes a storage compartment 17 disposed in a back end portion 15 thereof. The storage compartment 17 is adapted to store a measuring tape 29 for measuring fish caught. The housing 11 has a hole 16 extending through the back end 14 thereof with the hole 16 being adapted to receive a tape 30 of the measuring tape 29 therethrough. The housing 11 is essentially shaped like that of a fish with the housing 11 having a length of approximately 18 inches.

Net support members 19,22 are removably disposed inside the housing 11 and through the open front end 12. The housing 11 also includes a divider 18 securely and conventionally attached within the housing 11 and being disposed at the open front end 12 thereof for spreading the net support members 19,22 upon the net support members 19,22 being urgingly removed from inside the housing 11. The net support members 19,22 are essentially a pair of elongate tubular members each having a front end 21, 24 and a back end 20, 23 which is conventionally attached to one another. Each elongate tubular member 19,22 has a portion which is movably disposed along a respective side of the divider 18. Each elongate tubular member 19,22 has a curved front end portion 21, 24 which is curved toward the other of the elongate tubular members 19,22.

A net member 25 is conventionally attached to the net support members 19,22 and is removably disposed within the housing 11 with the net member 25 being essentially carried about the elongate tubular members 19,22. A means for releasing and urging the net support members 19,22 from within the housing 11 includes a spring 26 being securely and conventionally disposed within the housing 11 and being securely and conventionally attached to the divider 18, and also includes a retaining member 27 which is securely and releaseably and conventionally connected to at least one of the elongate tubular members 19, and further includes a release member 28 which is movably and conventionally disposed in and upon the side wall 13 of the housing 11 and is conventionally attached to the retaining member 27 with the release member 28 being essentially a fin-shaped trigger member.

In use, the user depresses the fin-like trigger member 28 which causes the retaining member 27 to release the net support member 19 which is urged along with the other net support member 22 through the open front end 12 of the housing 11 by the spring 26 thus deploying the net member 25 for use outside the housing 11. When finished, the user simply urges the net support members 19,22 back into the housing 11 and connects the retaining member 27 to the net support member 19 until the fishing net device 10 is again needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing net device comprising:
    a housing having a side wall and an open front end;
    net support members being movably mounted in said housing such that the net support members are movable from a retracted position in which said net support members are positioned in said housing and an extended position in which said net support members extend from said open front end of said housing, said net support members each having a front end and a back end, said back ends of said net support members being pivotally connected together in said housing;

a net member attached to said net support members and being removably disposed within said housing; and a means for releasing and urging said net support members from inside said housing;

wherein said housing also includes a divider securely attached in said housing, said divider being positioned in said housing between said net support members such that said divider blocks movement of the pivotally connected rear ends of said net support members out of said housing when said net support members are moved from said retracted position toward said extended portion to prevent said net support members from entirely moving out of said housing; and wherein said means for releasing and urging said net support members from within said housing includes a spring disposed within said housing and being securely attached to said divider.

2. A fishing net device as described in claim 1, wherein said divider is immovably mounted in said housing and is disposed at said open front end thereof for spreading said net support members upon said net support members being moved from said retracted position toward said extended position.

3. A fishing net device as described in claim 1, wherein said housing is tapered inwardly from said open front end toward a back end thereof for a user to easily and conveniently hold said housing.

4. A fishing net device as described in claim 1, wherein said net support members comprise a pair of elongate tubular members.

5. A fishing net device as described in claim 1, wherein each said net support member has a portion which is movably disposed along a respective side of said divider.

6. A fishing net device as described in claim 1, wherein each said net support member has a curved front end portion which is curved toward the other of said net support members.

7. A fishing net device as described in claim 1, wherein said net member is carried about said net support members.

8. A fishing net device as described in claim 1, wherein said means for releasing and urging said net support members from within said housing includes a retaining member which is securely and releaseably connected to at least one of said net support members, and further includes a release member which is movably disposed in and upon said side wall of said housing and being attached to said retaining member.

9. A fishing net device as described in claim 8, wherein said release member is essentially a fin-shaped trigger member.

10. A fishing net device as described in claim 1, wherein said housing further includes a storage compartment disposed in a back end portion thereof, said storage compartment being adapted to store a measuring tape for measuring fish caught, said housing having a hole extending through said back end thereof, said hole being adapted to receive a tape of the measuring tape therethrough.

11. A fishing net device as described in claim 1, wherein said housing is shaped like that of a fish.

12. A fishing net device comprising:

a housing having a side wall and an open front end;

net support members being movably mounted in said housing such that the net support members are movable from a retracted position in which said net support members are positioned in said housing and an extended position in which said net support members extend from said open front end of said housing, said net support members each having a front end and a back end, said back ends of said net support members being pivotally connected together in said housing;

a net member attached to said net support members and being removably disposed within said housing; and a means for releasing and urging said net support members from inside said housing;

wherein said housing also includes a divider securely attached in said housing, said divider being positioned in said housing between said net support members such that said divider blocks movement of the pivotally connected rear ends of said net support members out of said housing when said net support members are moved from said retracted position toward said extended portion to prevent said net support members from entirely moving out of said housing;

wherein said divider is immovably mounted in said housing and is disposed at said open front end thereof for spreading said net support members upon said net support members being moved from said retracted position toward said extended position;

wherein said housing is tapered inwardly from said open front end toward a back end thereof for a user to easily and conveniently hold said housing;

wherein each said net support member has a portion which is movably disposed along a respective side of said divider;

wherein each said net support member has a curved front end portion which is curved toward the other of said net support members;

wherein said net member is carried about said net support members;

wherein said means for releasing and urging said net support members from within said housing includes a spring disposed within said housing and being securely attached to said divider, and also includes a retaining member which is securely and releaseably connected to at least one of said net support members, and further includes a release member which is movably disposed in and upon said side wall of said housing and being attached to said retaining member; and wherein said housing further includes a storage compartment disposed in a back end portion thereof, said storage compartment being adapted to store a measuring tape for measuring fish caught, said housing having a hole extending through said back end thereof, said hole being adapted to receive a tape of the measuring tape therethrough.

* * * * *